United States Patent
Katz et al.

(10) Patent No.: US 8,691,171 B2
(45) Date of Patent: Apr. 8, 2014

(54) REMOVING SULPHUR OXIDES FROM A FLUID STREAM

(71) Applicants: BASF SE, Ludwigshafen (DE); Research Triangle Institute, Research Triangle Park, NC (US)

(72) Inventors: Torsten Katz, Neustadt (DE); Christian Riemann, Altrip (DE); Karsten Bartling, Neustadt (DE); Sean Taylor Rigby, Houston, TX (US); Luke James Ivor Coleman, Durham, NC (US); Marty Alan Lail, Raleigh, NC (US)

(73) Assignees: BASF SE (DE); Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 13/782,290

(22) Filed: Mar. 1, 2013

(65) Prior Publication Data

US 2013/0259789 A1    Oct. 3, 2013

Related U.S. Application Data

(60) Provisional application No. 61/605,804, filed on Mar. 2, 2012.

(51) Int. Cl.
   *B01D 53/50* (2006.01)
(52) U.S. Cl.
   USPC .................................................. 423/242.7
(58) Field of Classification Search
   USPC .................................................. 423/242.7
   See application file for complete search history.

(56) References Cited

U.S. PATENT DOCUMENTS

| | | | |
|---|---|---|---|
| 2,295,587 A | 9/1942 | Fleming et al. | |
| 2,490,840 A | 12/1949 | Shaw | |
| 3,959,451 A | 5/1976 | Henderson et al. | |
| 7,419,646 B2 * | 9/2008 | Cadours et al. | 423/220 |
| 7,718,151 B1 * | 5/2010 | Hu | 423/220 |
| 8,455,693 B2 | 6/2013 | Chedid et al. | |
| 2007/0286783 A1 | 12/2007 | Carrette et al. | |
| 2013/0137893 A1 | 5/2013 | Ebel et al. | |

FOREIGN PATENT DOCUMENTS

| | | |
|---|---|---|
| EP | 0696469 A1 | 2/1996 |
| WO | WO-2009097317 A2 | 8/2009 |
| WO | WO-2012031281 A2 | 3/2012 |

* cited by examiner

*Primary Examiner* — Timothy Vanoy
(74) *Attorney, Agent, or Firm* — Novak Druce Connolly Bove + Quigg LLP

(57) ABSTRACT

A process for removing sulphur oxides from a fluid stream, such as flue gas, comprising: providing a non-aqueous absorption liquid containing at least one hydrophobic amine, the liquid being incompletely miscible with water; treating the fluid stream in an absorption zone with the non-aqueous absorption liquid to transfer at least part of the sulphur oxides into the non-aqueous absorption liquid and to form a sulphur oxide-hydrophobic amine-complex; causing the non-aqueous absorption liquid to be in liquid-liquid contact with an aqueous liquid whereby at least part of the sulphur oxide-hydrophobic amine-complex is hydrolyzed to release the hydrophobic amine and sulphurous hydrolysis products, and at least part of the sulphurous hydrolysis products is transferred into the aqueous liquid; separating the aqueous liquid from the non-aqueous absorption liquid. The process mitigates absorbent degradation problems caused by sulphur dioxide and oxygen in flue gas.

23 Claims, 16 Drawing Sheets

REMOVING SULPHUR OXIDES FROM A FLUID STREAM

CROSS-REFERENCE TO RELATED APPLICATIONS

This application claims the benefit of U.S. Provisional Application 61/605,804, filed Mar. 2, 2012, which is incorporated herein by reference.

STATEMENT OF GOVERNMENT LICENSE RIGHTS

This invention was made with U.S. government support under Contract No. (DE-AR0000093) awarded by the Department of Energy. The U.S. Government has certain rights in this invention.

BACKGROUND OF THE INVENTION

The present invention relates to a process for removing sulphur oxides, optionally together with other acid gases such as, in particular carbon dioxide and nitrogen oxides, from a fluid stream.

Combustion of fossil fuels generates the acid gases, carbon dioxide ($CO_2$), sulphur oxides ($SO_x$), and nitrogen oxides ($NO_x$). Emission of acid gases into the air is considered to be the main cause of global effects on the environment which are termed the greenhouse effect. The removal of acid gases from combustion exhaust gases is therefore desirable to reduce the environmental effects of these sources. Carbon dioxide capture from combustion exhaust gases may also provide supplies for $CO_2$ enhanced oil recovery (EOR).

Sulphur oxides, besides other acid gases, may also be present in refinery off-gases. The tail gas from Claus processes, while small in volume, has a relatively high concentration of sulphur oxides. These gases cannot be vented and still meet environmental regulatory requirements.

Current aqueous scrubbing technologies remove acid gases by treating the fluid streams with aqueous solutions of inorganic or organic bases, e.g. alkanolamines, as absorbents. On the dissolution of acid gases, ionic products form from the base and the acid gas components. The absorbent can be regenerated by heating, expansion to a lower pressure or stripping, in which case the ionic products react back to acid gases and/or the acid gases are stripped off by means of steam. After the regeneration process the absorption liquid can be reused.

Non-aqueous absorption liquids have been used to remove acid gases from fluid streams. It is claimed that non-aqueous absorption liquids require less energy for regeneration than aqueous solutions of organic bases. Single-component alcoholic physisorption solvents such as RECTISOL® and SELEXOL® are commercially available for $CO_2$ separation but perform poorly in the humid, near-ambient pressure conditions associated with combustion exhaust gas.

Ionic liquids are another non-aqueous absorption liquid currently being developed. These absorption liquids have higher $CO_2$ loadings than some aqueous amines, and are regenerable under milder conditions.

WO 2009/097317 discloses reversible acid-gas binding liquid systems that permit capture of acid gases and release of the acid gases from the liquid by the activation of a trigger. The exemplified systems are equimolar mixtures of amidine or guanidine nitrogen bases and alcohols. They are non-ionic room temperature liquids that react with $CO_2$ to form room-temperature ionic liquids. $CO_2$ is captured via the formation of amidinium and guanidinium alkyl carbonate salts derived from the conjugate bases of the deprotonated alcohol components.

A BRIEF DESCRIPTION OF THE FIGURES

FIG. 12 and FIG. 13 show how the aqueous liquid recovered from the process as described in FIGS. 2 through 9 or FIG. 11 is introduced back into the system.

A DETAILED DESCRIPTION OF THE INVENTION

Figure 1:
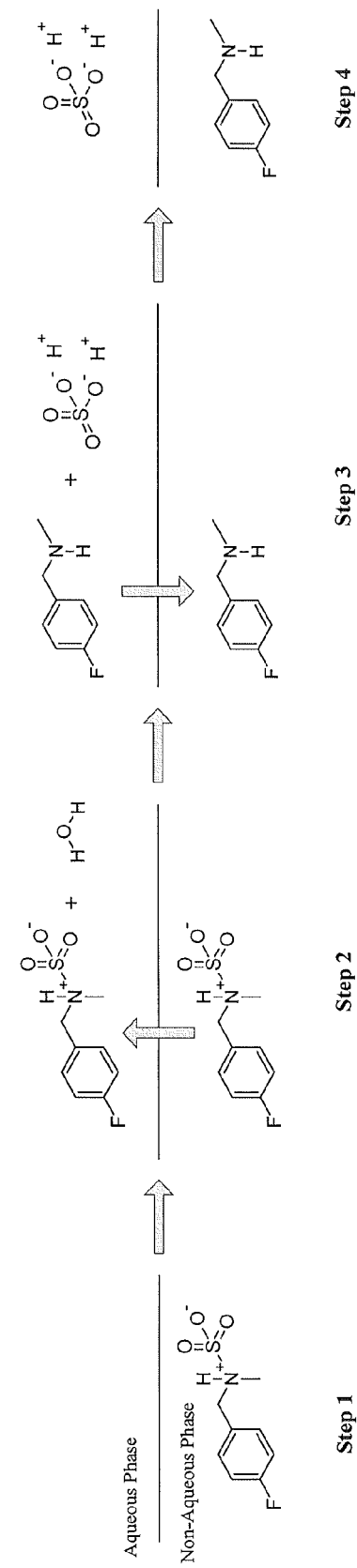
FIG. 1 depicts amine being separated from sulphurous hydrolysis product in a phase separation process involving hydrolysis of the sulfamic acid product.

When capturing $CO_2$ from combustion flue gas, conventional amine processes require that $SO_2$ be removed first from the flue gas stream, since amines are degraded by $SO_2$ and oxygen, forming irreversible degradation products. The annual cost of amine makeup is high because of degradation, even after most of the $SO_2$ is removed from the flue gas in an upstream flue gas desulphurisation process.

It is envisioned that the current utilized processes could be replaced with a single process to capture all major acid gases, including $SO_2$ and $CO_2$, which may exist in the flue gas.

The invention seeks to provide an acid gas capture process which does not have absorbent degradation problems that are caused by sulphur dioxide and oxygen in flue gas or which has these problems to a lesser extent.

The invention further seeks to provide an acid gas capture process capable of collecting basic amine components effectively from the treated fluid streams.

The invention provides a process for removing sulphur oxides from a fluid stream comprising
 a) providing a non-aqueous absorption liquid containing at least one hydrophobic amine, the non-aqueous absorption liquid being incompletely miscible with water;
 b) treating the fluid stream in an absorption zone with the non-aqueous absorption liquid to transfer at least part of the sulphur oxides into the absorption liquid and to form a sulphur oxide-hydrophobic amine-complex;
 c) causing the non-aqueous absorption liquid to be in liquid-liquid contact with an aqueous liquid whereby at least part of the sulphur oxide-hydrophobic amine-complex is hydrolyzed to release the hydrophobic amine and sulphurous hydrolysis products, and at least part of the sulphurous hydrolysis products is transferred into the aqueous liquid;
 d) separating the aqueous liquid from the non-aqueous absorption liquid.

Formation of the sulphur oxide-hydrophobic amine-complex may involve oxidation of the sulphur oxides. Typically, oxidation may be effected by molecular oxygen present in the fluid stream to be treated, such as a combustion exhaust gas.

The sulphurous hydrolysis products may comprise at least one of sulphurous acid and sulphuric acid, but are not limited thereto.

The sulphur oxide-hydrophobic amine-complex may comprise a sulfamic acid structural moiety. A hydrophobic amine may react with sulphur dioxide, an oxidant, and water according to the mechanism in Scheme 1 where (I) denotes a hydrophobic liquid phase, (g) denotes a gas phase, and (aq) denotes an aqueous liquid phase. The possible mechanism is illustrated with the hydrophobic amine being 4-fluoro-N-methyl-benzylamine; it should, however, be understood that the invention is not limited to a particular hydrophobic amine.

hydrophobic amine is a fluorinated amine. "Fluorinated amine" is intended to mean an amine where at least on hydrogen atom on an alkyl, aryl, arylalkyl or alkylaryl residue attached to the amino group is replaced by a fluorine atom. In preferred embodiments, the hydrophobic amine is a fluorinated amine which comprises an aromatic structure linked to the amino group either directly or via an alkylene group, e.g., a $C_1$-$C_8$ alkylene group.

Preferred amines for this process include 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine,

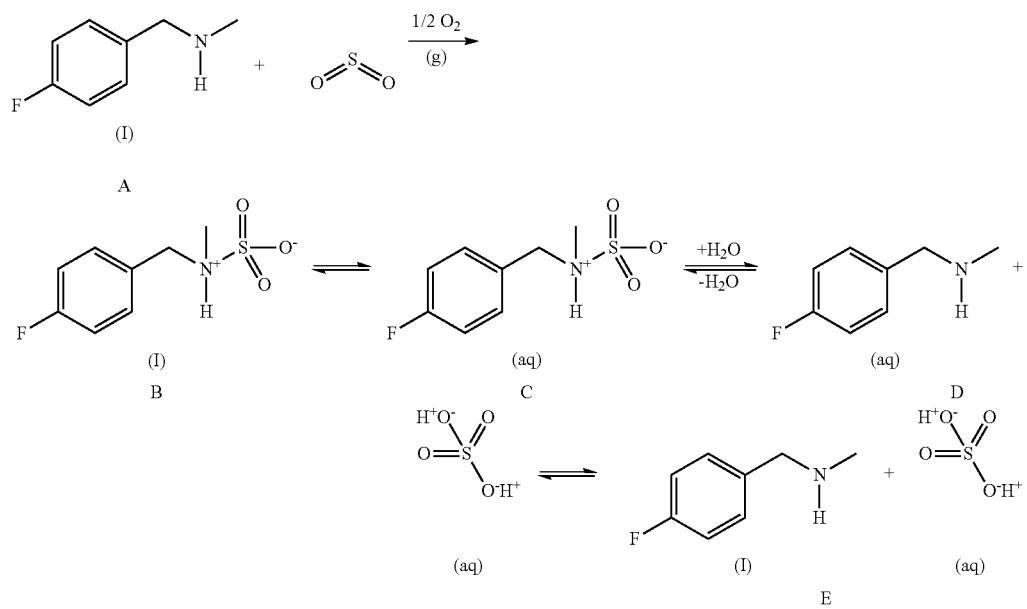

Scheme 1. Reaction mechanism depicting $SO_2$ absorption by a hydrophobic amine.

In Step A of the process, a hydrophobic amine in the non-aqueous absorption liquid phase reacts with $SO_2$ and an oxidant to produce sulfamic acid (Step B). When the non-aqueous absorption liquid phase is brought into contact with an aqueous phase, the zwitterionic sulfamic acid may partition from the non-aqueous absorption liquid phase to the aqueous phase. The exact nature of the partitioning mechanism is not critical to the invention. Examples of conceivable partitioning methods include 1) initial transfer of the sulfamic acid from the non-aqueous absorption liquid phase to the aqueous liquid phase with subsequent hydrolysis in the aqueous phase (Step C to Step D), or 2) hydrolysis of the sulfamic acid in the non-aqueous absorption liquid phase at the liquid-liquid phase interface (Step B to Step E). Although, sulfamic acid was used for explanatory purposes, various sulphur-containing complexes with amines, such as sulfate salts, may also be envisioned.

A "hydrophobic amine" is intended to denote an amine that has limited solubility in water, for example, an amine having a solubility in water at 25° C. of less than 20 g/100 ml, preferably less than 10 g/100 ml.

Preferably, the hydrophobic amine may be selected from primary amines, and secondary amines. In an embodiment, the hydrophobic amine comprises an aromatic structure linked to the amino group either directly or via an alkylene group, e.g., a $C_1$-$C_8$ alkylene group. In an embodiment, the 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine, 3,5-di-fluorobenzylamine, 2-trifluormethylbenzylamine, 3-trifluormethylbenzylamine, 4-trifluormethylbenzylamine.

Besides the hydrophobic amine, the non-aqueous absorption liquid may contain one or more non-aqueous diluents. The non-aqueous diluent may be selected from alcohols, in particular fluorinated alcohols.

Preferred diluents for this process include from 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; and mixtures thereof.

The hydrophobic amine and, where used, the non-aqueous diluent are selected such that the non-aqueous absorption liquid used in the process is incompletely miscible with water or, in other words, shows a miscibility gap with water. In preferred embodiments, the non-aqueous absorption liquid is essentially immiscible with water. Generally, less than 20% by weight of water is soluble in the absorption liquid at 25° C., for example less than 10% by weight or less than 8% by weight, preferably less than 5% by weight of water. If a higher amount of water is present, a separate aqueous phase will form within the non-aqueous absorption liquid.

For example, as the hydrocarbon chain of aliphatic alcohols is increased in length, the solubility of the alcohol in water decreases. This is also true for fluorinated alcohols. For example, 2,2,3,3,4,4,5,5-octafluoropentanol ("OFP") is essentially immiscible with water. Thus, a non-aqueous absorption liquid comprising a hydrophobic amine and OFP forms a biphasic liquid solution when combined with water. In such a non-aqueous absorption liquid, water can be separated from the solvent system without distillation or the use of a membrane by decanting or centrifugation of the aqueous layer from the fluorinated phase.

The method according to the invention is suitable for the treatment of fluid streams, in particular gas streams of all types. The sulphur oxides comprise $SO_3$, and $SO_2$. The fluid stream may comprise acid gases other than sulphur oxides such as, in particular, $CO_2$, $NO_x$, $H_2S$, COS and mercaptans.

The process according to the invention is particularly applicable to the treatment of fluid streams wherein the partial pressure of acid gases in the fluid stream is less than 2 bar, preferably less than 1 bar, e.g. less than 500 mbar.

Fluids, which contain the acid gases are either gases such as synthesis gas, coke oven gas, cracked gas, coal gasification gas, recirculated cycle gas, refinery off-gases, tail gas from Claus processes, natural gas, and combustion gases; or liquids which are essentially immiscible with the absorbent.

In preferred embodiments, the fluid stream originates from (i) the oxidation of organic substances, (ii) the composting or storage of waste materials comprising organic substances, or (iii) the bacterial decomposition of organic substances.

The oxidation can be carried out with appearance of flame, i.e., as conventional combustion, or as oxidation without appearance of flame, e.g. in the form of a catalytic oxidation or partial oxidation. Organic substances which are subjected to the combustion are customarily fossil fuels, such as coal, natural gas, petroleum, gasoline, diesel, raffinates or kerosene, biodiesel or waste materials having a content of organic substances. Feed stocks of the catalytic (partial) oxidation are e.g. methanol or methane which can be converted to formic acid or formaldehyde.

Waste materials which are subjected to oxidation, composting or storage are typically domestic refuse, plastic wastes or packaging refuse.

The organic substances are combusted mostly in customary combustion plants with air. The composting and storage of waste materials comprising organic substances generally proceed in refuse landfills. The exhaust gas or the exhaust air of such facilities can be treated advantageously by the method according to the invention.

As organic substances for bacterial decomposition use is customarily made of stable manure, straw, liquid manure, clarified sewage sludge, fermentation residues and the like. The bacterial decomposition proceeds e.g. in customary biogas plants. The exhaust air of such plants can advantageously be treated by the method according to the invention.

The method is also suitable for the treatment of exhaust gases of fuel cells or chemical synthesis plants which make use of a (partial) oxidation of organic substances.

The fluid streams of the origin (i), (ii) or (iii) above can have, for example, either the pressure which roughly corresponds to the pressure of the ambient air, that is to say e.g. atmospheric pressure, or a pressure which deviates from atmospheric pressure by up to 1 bar. However, the fluid stream may also have a higher pressure.

Exhaust gases from combustion processes are preferred fluid streams to be treated according to the invention.

The fluid stream is brought into fluid-liquid contact with the non-aqueous absorption liquid in an absorption zone. The absorption zone may comprise any suitable apparatus, for example an absorption tower or an absorption column, e.g. a random packed column, arranged packing column, a tray column and/or in another absorber such as membrane contactors, radial flow scrubbers, jet scrubbers, Venturi scrubbers and rotary spray scrubbers. The fluid stream is preferably treated with the non-aqueous absorption liquid in an absorption column in countercurrent flow. The fluid stream in this case is generally fed into the lower region of the absorption zone and the non-aqueous absorption liquid into the upper region of the absorption zone.

It is a feature of the invention that the non-aqueous absorption liquid is caused to be in liquid-liquid contact with an aqueous liquid whereby at least part of the sulphur oxide-hydrophobic amine-complex is hydrolyzed to release the hydrophobic amine and sulphurous hydrolysis products. At least part of the sulphurous hydrolysis products is transferred into the aqueous liquid; and the aqueous liquid is separated from the non-aqueous absorption liquid.

Liquid-liquid contact of the non-aqueous absorption liquid with an aqueous liquid can be accomplished by any process unit in which intimate contact between the aqueous liquid and non-aqueous absorption liquid can be facilitated, such as an extractor or decanter. Liquid-liquid contact can also be accomplished by passing a bi-phase mixed stream of the non-aqueous absorption liquid and aqueous liquid through a pipe.

In one embodiment, the non-aqueous absorption liquid is caused to be in liquid-liquid contact with the aqueous liquid by condensing water vapour which is present in the fluid stream to be treated. Combustion exhaust gases typically contain appreciable amounts of water vapour or are water vapour-saturated. Upon contact of a non-aqueous absorption liquid with the water vapour-containing fluid stream, water vapour may condense and/or become dissolved into the non-aqueous absorption liquid. These effects lead to the accumulation of water in the non-aqueous absorption liquid.

Since the invention utilizes a non-aqueous absorption liquid which is incompletely miscible with water (or, in other words, shows a miscibility gap with water), the water introduced may sooner or later accumulate as a separate aqueous phase within the non-aqueous absorption liquid system. If not removed from the process, water may accumulate and overwhelm the process. Therefore, the process according to the invention may serve to maintain the water balance at a desired level and to enable the long-term, continuous operation of a non-aqueous, acid gas absorbing liquid process.

Phase separation may be triggered or induced by a stimulus, such as a temperature change or a pressure change.

Alternatively, if the fluid stream to be treated does not contain water vapour or contains an insufficient amount of water vapour, the non-aqueous absorption liquid may be caused to be in liquid-liquid contact with the aqueous liquid by contacting the non-aqueous absorption liquid with water or an aqueous phase from an extraneous source.

The aqueous liquid may be separated by at least one of decanting and centrifuging. Mechanical coalescing techniques or electrocoalescing may be employed in order to obtain the aqueous liquid and the non-aqueous absorption liquid one another in cohesive form and largely free of extraneous phase.

For decanting, the bi-phase mixture can be introduced into a calming zone and be separated there. This is advantageously achieved in a horizontal, continuously operated phase separation vessel through which the mixture flows at a low flow velocity. Due to the density difference between the phases, the mixture separates in the gravitational field. Separators having coalescence internals such as packing elements, coalescence surfaces or porous elements may suitably be used.

The relative densities of the aqueous liquid and the non-aqueous absorption liquid will determine which layer is upper and which is lower. The aqueous liquid will separate as upper layer when the density of the non-aqueous absorption liquid is greater than that of the aqueous liquid. The aqueous liquid will separate as lower layer when the density of the non-aqueous absorption liquid is smaller than that of the aqueous liquid.

Heating of the aqueous liquid containing the sulphur oxide-hydrophobic amine-complex, or of the bi-phase, mixed non-aqueous absorption liquid/aqueous liquid, may facilitate the hydrolysis reaction and return of the hydrophobic amine to the non-aqueous absorption liquid to occur.

The described chemistry and process concept can be considered as a stand-alone process for separation of sulphur-containing acid gas species from fluid streams such as process gas streams.

Furthermore, the described chemistry and process concept can be considered as a method for simultaneous separation of sulphur-containing and other acid gases, such as but not limited to $CO_2$ and $NO_x$, from fluid streams such as process gas streams.

The non-aqueous absorption liquid can reversibly bind acid gases such as carbon dioxide. A reaction pathway for capturing $CO_2$ involves reaction of a primary or secondary hydrophobic amine with $CO_2$ from the fluid stream to form a carbamate salt.

A treated fluid stream depleted of acid gases is formed and a non-aqueous absorption liquid loaded with acid gases is formed which leave the absorption zone. The process will comprise a step e) of regenerating the loaded non-aqueous absorption liquid to expel the acid gases at least in part and obtain a regenerated non-aqueous absorption liquid. "Regenerated non-aqueous absorption liquid" as used herein should be construed to encompass both a fully or partially regenerated non-aqueous absorption liquid. The regenerated non-aqueous absorption liquid is directed to step b). Expediently, regeneration of the loaded non-aqueous absorption liquid occurs by pressure release, heating, stripping or any combination thereof.

Before the regenerated non-aqueous absorption liquid is reintroduced into the absorption zone, it may be required to be cooled to a suitable absorption temperature. When the regeneration of the loaded non-aqueous absorption liquid involves heating of the loaded non-aqueous absorption liquid, it is preferred, in order to utilize the energy present in the hot regenerated non-aqueous absorption liquid, to preheat the loaded non-aqueous absorption liquid from the absorber by heat exchange with the hot regenerated non-aqueous absorption liquid. By means of the heat exchange the loaded non-aqueous absorption liquid is brought to a higher temperature, and so in the regeneration step a lower energy input is required. By means of the heat exchange, also a partial regeneration of the loaded non-aqueous absorption liquid can proceed with liberation of acid gases.

The exact place where the aqueous liquid is separated from the non-aqueous absorption liquid is of no critical importance. Separation of an aqueous liquid can occur in more than one place. Thus, at least one of the loaded non-aqueous absorption liquid, regenerated non-aqueous absorption liquid and condensed non-aqueous absorption liquid vapours such as stripper condensate, may be subjected to liquid-liquid phase separation to separate the aqueous liquid therefrom.

Regeneration of the loaded non-aqueous absorption liquid may comprise heating the loaded non-aqueous absorption liquid and subjecting the heated, loaded non-aqueous absorption liquid to pressure release. In an embodiment, the heated, loaded non-aqueous absorption is subjected to liquid-liquid phase separation, prior to pressure release, to separate the aqueous liquid therefrom.

The non-aqueous absorption liquid which has been separated from the aqueous liquid can be returned to the capture process. The aqueous liquid can be sent to the waste water treatment facility. Since, however, the non-aqueous absorption liquid shows—even though limited—solubility in water the aqueous liquid contains traces of absorption liquid and discharge thereof will cause undesirable absorption liquid losses. It is therefore desirable to decrease the volume of the aqueous liquid and/or concentrate the aqueous liquid.

In a preferred embodiment, at least part of the separated aqueous liquid is brought into fluid-liquid contact with the treated fluid stream. Upon fluid-liquid contact of the treated fluid stream with the aqueous liquid, at least part of the water contained in the aqueous liquid can be volatilized and picked up by the treated fluid stream. This serves to rehydrate the treated fluid stream exiting the absorption zone as a means of maintaining the process-wide water balance. Thus, the treated fluid stream acts as an outlet for at least part of the accumulated water. Generally, absorption of acid gases from the fluid stream into the absorption liquid is an exothermic process. The exothermic heat is taken up, at least in part, by the treated fluid stream. Thus, the heat of evaporation can be supplied by the exothermic heat of acid gas absorption. No significant additional energy expenditure is involved.

Fluid-liquid contact of the treated fluid stream with the aqueous liquid may also serve to transfer non-aqueous absorption liquid components that are entrained in the treated fluid stream at least in part into the aqueous liquid. Thus, emissions of the absorption liquid via the treated fluid stream can be avoided or reduced. The acidic nature of the aqueous liquid will increase the solubility of the hydrophobic amine component of the non-aqueous absorption liquid and thus promote the transfer of the hydrophobic amine component from the treated fluid stream into the aqueous liquid.

Fluid-liquid contact of the treated fluid stream with the aqueous liquid may be accomplished by directing the treated fluid stream to a scrubbing zone in which the treated fluid stream is scrubbed with the separated aqueous liquid.

In the scrubbing zone, the treated fluid stream which is depleted of acid gases, is brought into fluid-liquid Contact with the aqueous liquid. The scrubbing zone may comprise any suitable apparatus for contacting a fluid and a liquid, for example a random packed column, arranged packing column, or a tray column.

Suitably, the scrubbing zone is arranged on top of the absorption zone. Thus, in a suitable embodiment the fluid stream is passed upwards through a tower including a lower portion containing the absorption zone and an upper portion containing the scrubbing zone.

The spent aqueous liquid containing the entrained non-aqueous absorption liquid components may be collected and subjected to liquid-liquid phase separation to obtain an aqueous phase and an entrained non-aqueous absorption liquid component phase. At least part of the entrained absorption liquid component phase may be recycled into the process, i.e., combined with the bulk loaded non-aqueous absorption liquid or the bulk regenerated non-aqueous absorption liquid or both. The aqueous phase may be discharged, e.g., sent to waste water treatment.

Alternatively, fluid-liquid contact of the treated fluid stream with the aqueous liquid may be accomplished by introducing the aqueous liquid into the absorption zone at a height at or above the feeding point of the non-aqueous absorption liquid into the absorption zone. Thus, the fluid-liquid contact of the treated fluid stream with the aqueous liquid may occur to some extent concomitantly with the treatment of the fluid stream with the non-aqueous absorption liquid. It should be noted that, even though the fluid stream entering the absorption zone may contain water vapour or be water vapour saturated, the water vapour is condensed out from the fluid stream during passage though the absorption zone. The non-aqueous absorption liquid does not have a significant water vapour partial pressure. Therefore, the fluid stream is largely depleted of water vapour when reaching the upper part of the absorption zone or leaving the absorption zone.

The inventive process will be explained in more detail with respect to a $CO_2$ capture process in which a combustion exhaust gas (flue gas) comprising carbon dioxide and sulphur oxides is treated.

As described above, the amine component of the non-aqueous absorption liquid reacts with $SO_2$ and $O_2$, both present in combustion exhaust gases, in the $CO_2$ absorption zone of the $CO_2$ capture process to form a sulfamic acid (Step 1, FIG. 1). The sulphur-containing species may be slightly, moderately, or highly soluble in an aqueous phase depending on the specific amine structure. With respect to amine recovery, it makes little difference where hydrolysis actually occurs (aqueous phase, non-aqueous absorption liquid phase, or liquid-liquid interface). When the sulfamic acid is more soluble in aqueous solution than in the non-aqueous absorption liquid, the sulfamic acid species will diffuse across the liquid-liquid interface, as shown in Step 2. In the presence of large quantities of water, the sulfamic acid is hydrolyzed to form a sulphur-containing acid, such as $H_2SO_4$, liberating the amine component of the non-aqueous absorption liquid as shown in Step 3. Due to the very low solubility of the hydrophobic amine component in aqueous solutions, it returns to the non-aqueous absorption liquid (Step 3). The ultimate result is the reclamation of the amine component of the non-aqueous solvent and the formation of a highly dilute sulphur-containing acid, or an acidified aqueous solution (Step 4).

In the case where the sulfamic acid has low solubility in water, the hydrolysis can occur at the liquid-liquid interface and can practically be described simply as a process which involves Step 1 and Step 4. The location of the hydrolysis reaction is dictated by the rate of the hydrolysis reaction and the rate of sulfamic acid diffusion across the liquid-liquid interface. If the hydrolysis reaction rate is very high, the reaction will occur at the liquid-liquid interface and if the rate of diffusion is very high, the reaction will occur within the aqueous solution. In addition, depending upon the concentration of soluble water in the non-aqueous absorption liquid, the hydrolysis reaction may occur in the non-aqueous absorption liquid. However, to remove the sulfuric acid from the non-aqueous absorption liquid, the non-aqueous absorption liquid must be washed with an aqueous solution. This can be accomplished, for example, in a decanter, or any other process unit in which intimate contact between the aqueous liquid and non-aqueous solvent can be facilitated. Regardless of the location of the hydrolysis reaction, this simple solvent reclamation process is made possible by the water solubility difference between the hydrophobic amine and the sulphurous hydrolysis product. Even if the hydrolysis reaction is not thermodynamically favored, it can be driven due to the large excess of water and the low solubility of the hydrophobic amine component in the aqueous solution, from which it is continuously removed by phase separation. The process may require or be accelerated by application of heat but may also be accomplished without additional heating. One knowledgeable in the field of mass transfer and reaction engineering can imagine many options for increasing the rate of separation.

The primary purpose of the decanter vessel is the removal of excess water from the non-aqueous absorption liquid such that water does not accumulate in the capture process. It is envisioned that the sulphur oxide reclamation process will occur within the decanter vessel of the proposed non-aqueous $CO_2$ capture process arrangement. It should be noted that the non-aqueous absorption liquid may enter the decanter vessel saturated with water, typically less than 8 wt % $H_2O$, and possibly with a separate aqueous phase (two-phase flow). The water-solvent decanter is an ideal process unit for reclaiming the amine component of the non-aqueous absorption liquid, as it provides a means for the aqueous liquid and the non-aqueous absorption liquid phases to be in intimate contact, a defined liquid-liquid interface, and a means for separating the non-aqueous absorption liquid and the acidified aqueous solution.

The acidified aqueous liquid can be used in the scrubbing zone to strip the basic amine component from the $CO_2$-lean treated fluid stream as a means of reducing fugitive amine emissions. The $CO_2$-lean treated fluid stream exiting the $CO_2$ absorber will be saturated with the non-aqueous solvent components. Absorption liquid components are typically selected such that the vapor losses are very small, however, they have appreciable vapor pressure at the $CO_2$ absorber process conditions. To reduce these evaporative losses, the acidified aqueous solution could be used to wash the gas exiting the $CO_2$ absorber. The acidic nature of the aqueous solution will increase the solubility of the amine component of the non-aqueous absorption liquid and thus promote the stripping of the hydrophobic amine component from the treated fluid stream. The spent aqueous liquid containing the captured hydrophobic amine component can then be recycled back to the water-solvent decanter to recover the hydrophobic amine component and return it to the non-aqueous absorption liquid.

The acidified aqueous solution can also be neutralized by reaction with for example an alkali or alkaline hydroxide or carbonate to form a sulfate salt and an aqueous solution. Neutralization may lower the solubility of the hydrophobic amine component in the aqueous solution.

The invention will be illustrated in more detail by the accompanying drawings and the example which follows.

FIG. 1 depicts amine being separated from sulphurous hydrolysis product in a phase separation process involving hydrolysis of the sulfamic acid product.

FIG. 2 through FIG. 11 depict installations suitable for carrying out the method of removing an aqueous liquid from the process according to the invention.

Figure 11:
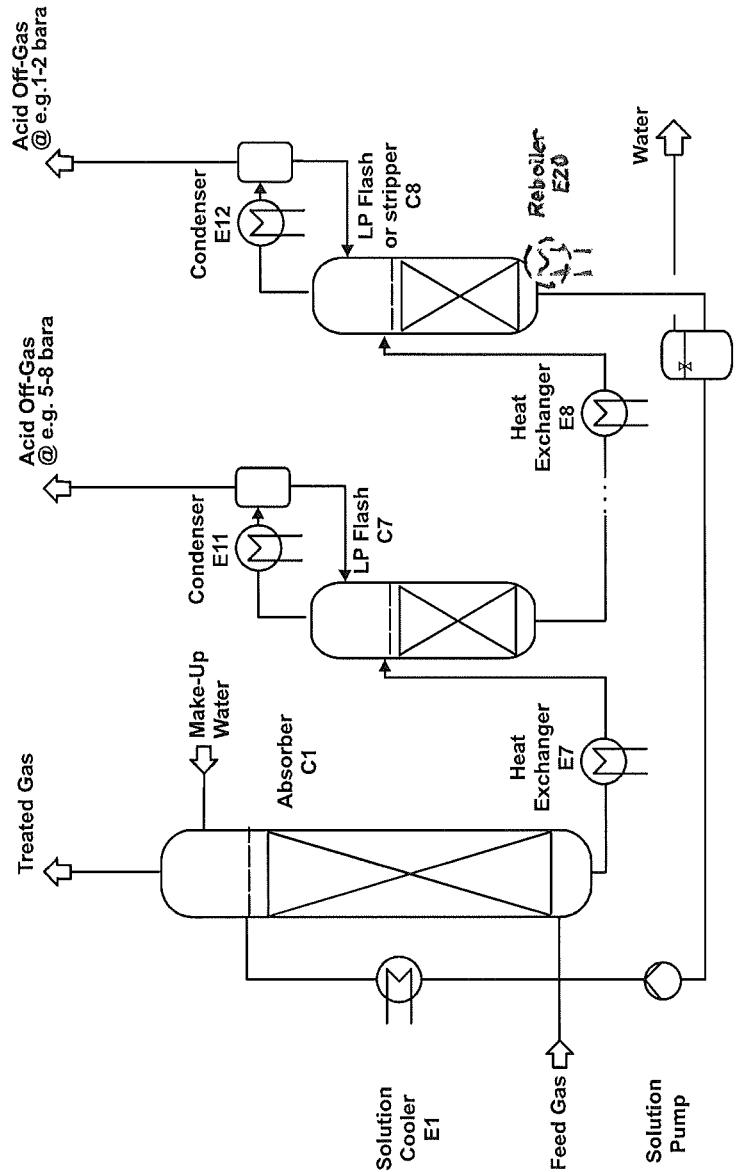
Figure 12:
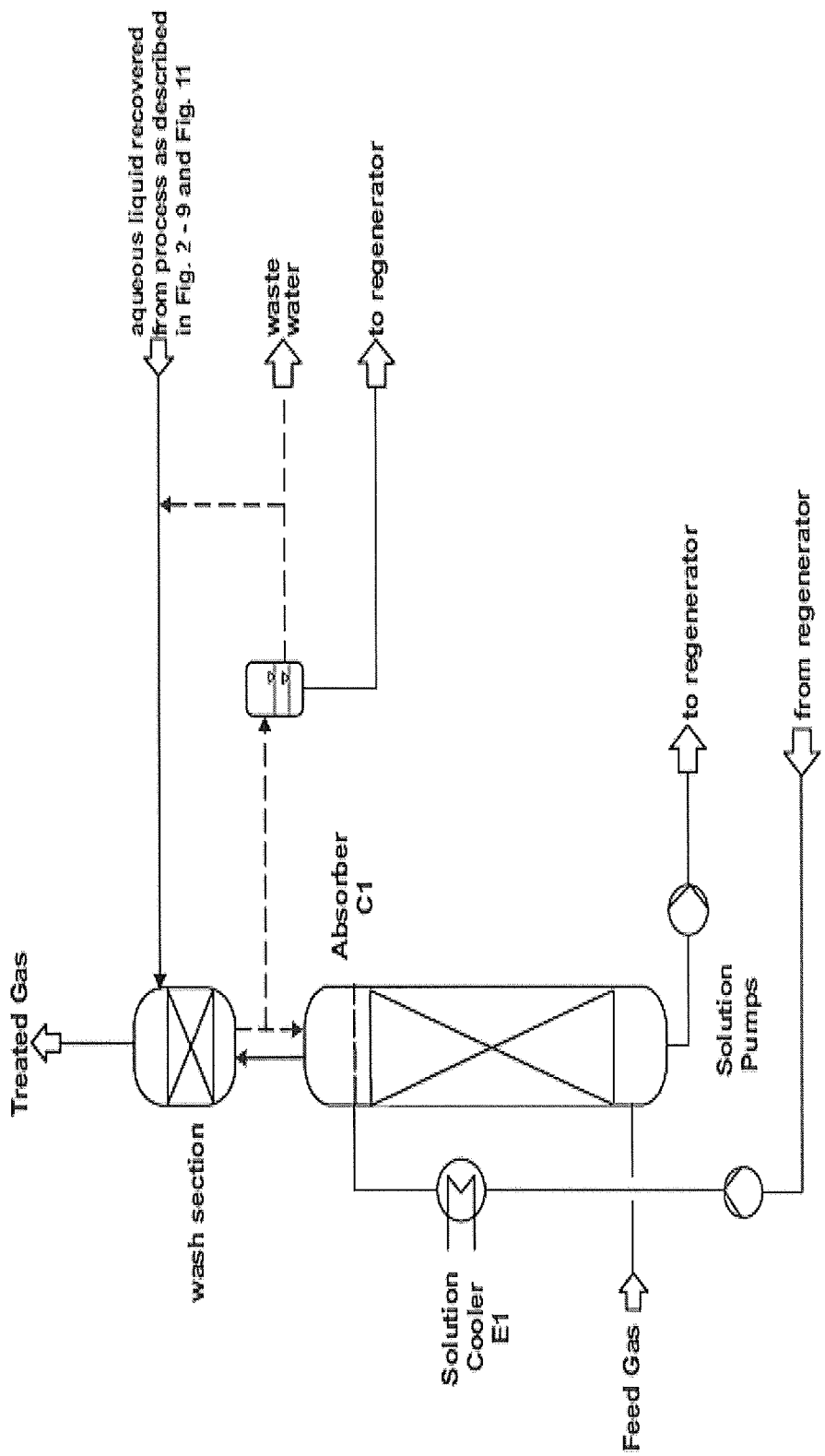
Figure 13:
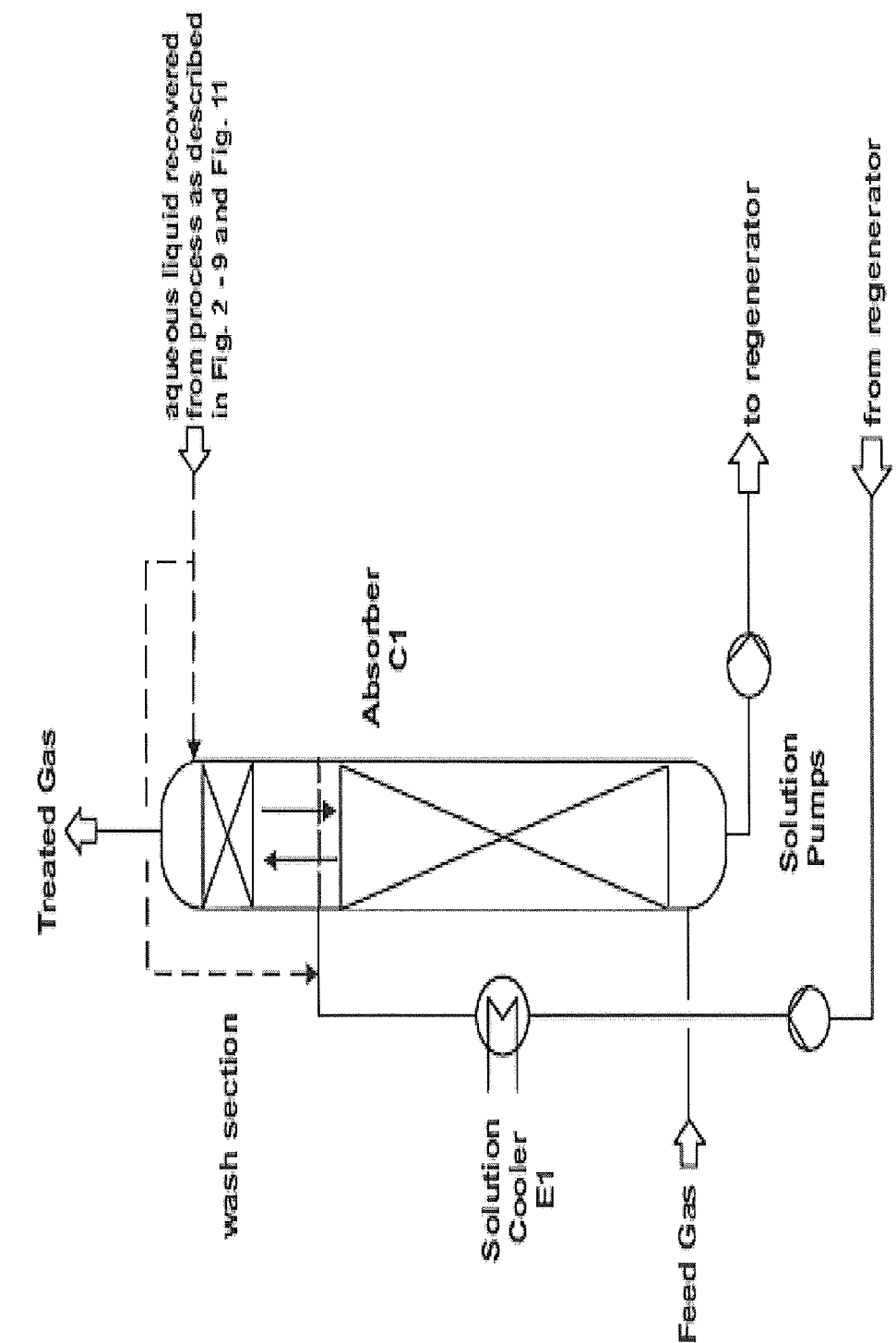

FIG. 12 and FIG. 13 show how the aqueous liquid recovered from the process as described in FIGS. 2 through 9 or FIG. 11 is introduced back into the system.

Figure 14:
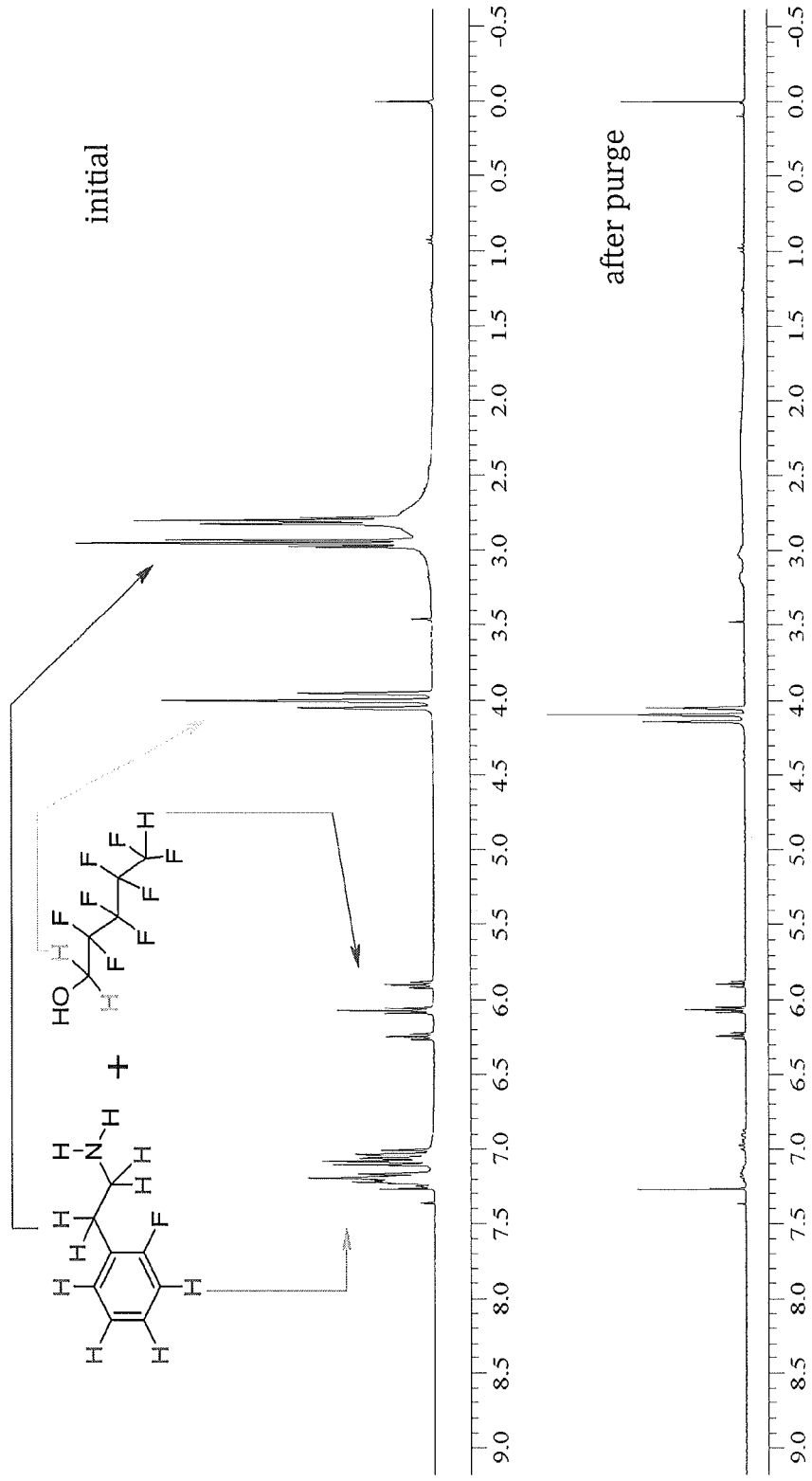
FIG. 14 shows a $^1H$ NMR of a non-aqueous solvent containing a hydrophobic amine and a hydrophobic alcohol before and after $SO_2$ purge.

FIG. 14 shows a $^1H$ NMR of a non-aqueous solvent containing a hydrophobic amine and a hydrophobic alcohol before and after $SO_2$ purge.

Figure 15:
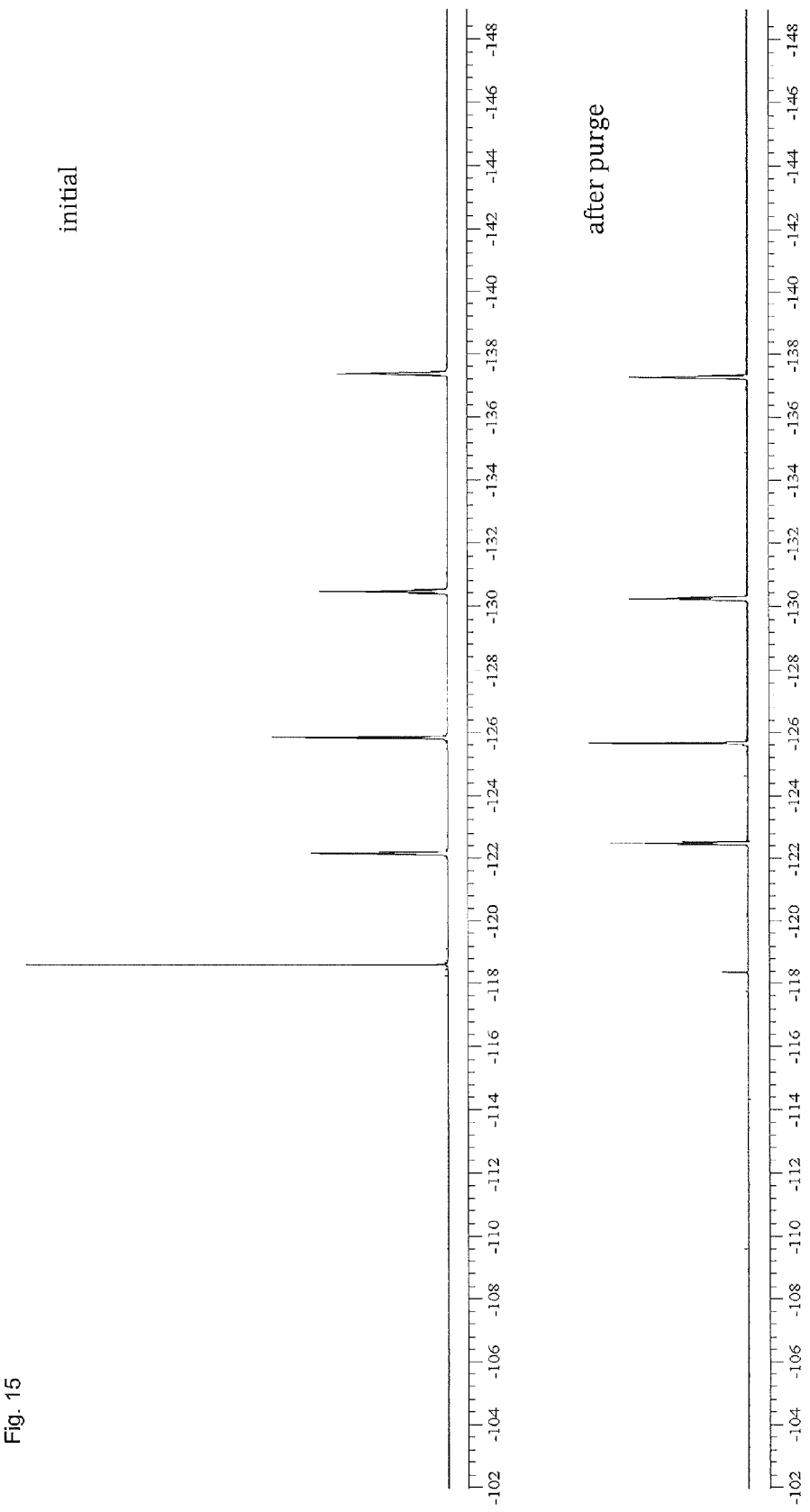
FIG. 15 shows a $^{19}F$ NMR of a non-aqueous solvent containing a hydrophobic amine and a hydrophobic alcohol before and after $SO_2$ purge.

FIG. 15 shows a $^{19}F$ NMR of a non-aqueous solvent containing a hydrophobic amine and a hydrophobic alcohol before and after $SO_2$ purge.

Figure 16:
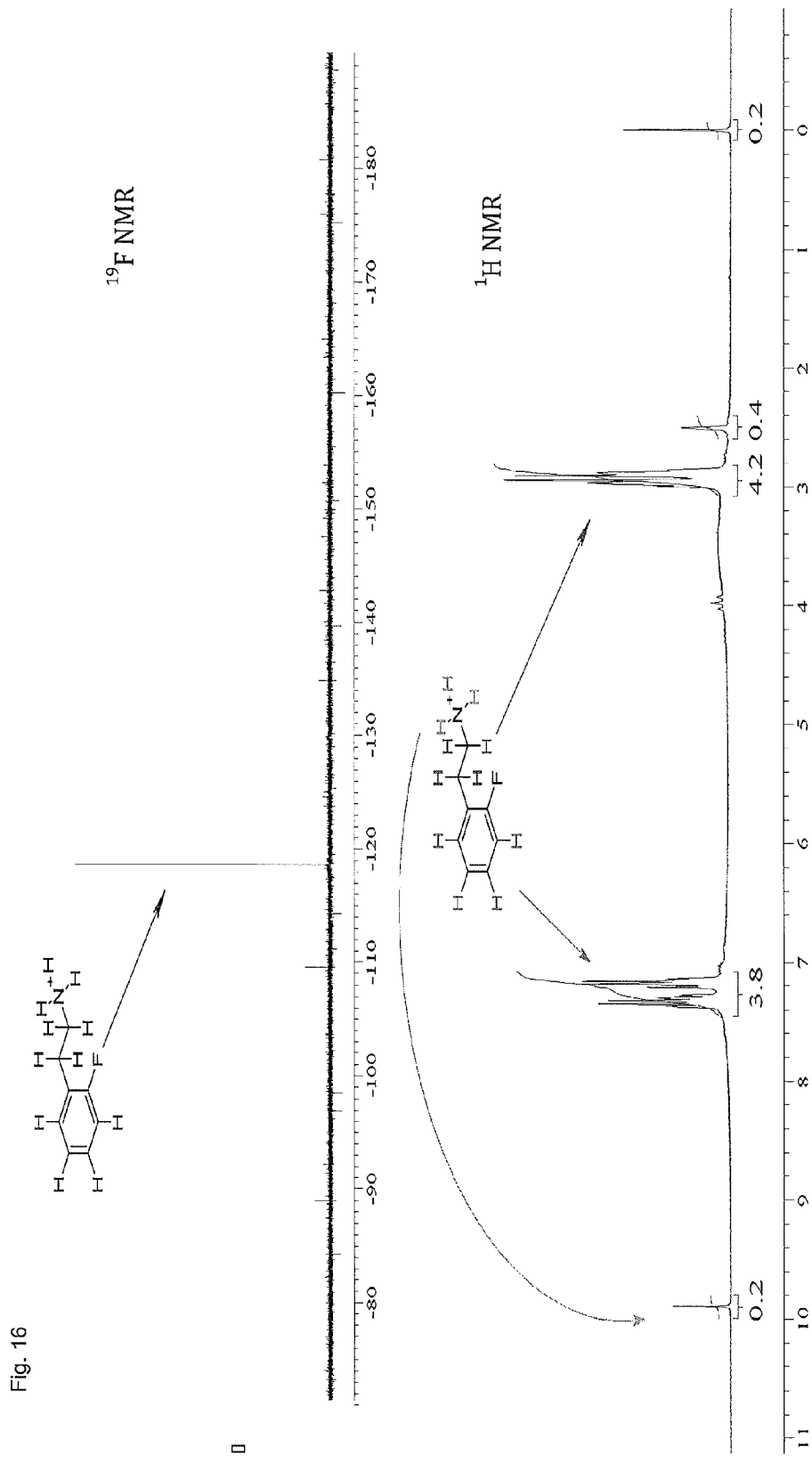
FIG. 16 shows $^{19}F$ and $^1H$ NMR spectra of precipitated sulphur product in DMSO-$d_6$.

FIG. 16 shows $^{19}F$ and $^1H$ NMR spectra of precipitated sulphur product in DMSO-$d_6$.

It should be appreciated that although the embodiments of FIGS. 2 to 9 and 11 exemplify the use of a single decanter each, multiple decanters can be used. Accordingly, each of the embodiments of FIGS. 2 to 9 and 11 may, in addition to the decanter shown, comprise one or more additional decanters at another place. In particular, combinations of the embodiments of FIGS. 2 to 9 and 11 are explicitly envisaged.

Figure 2:
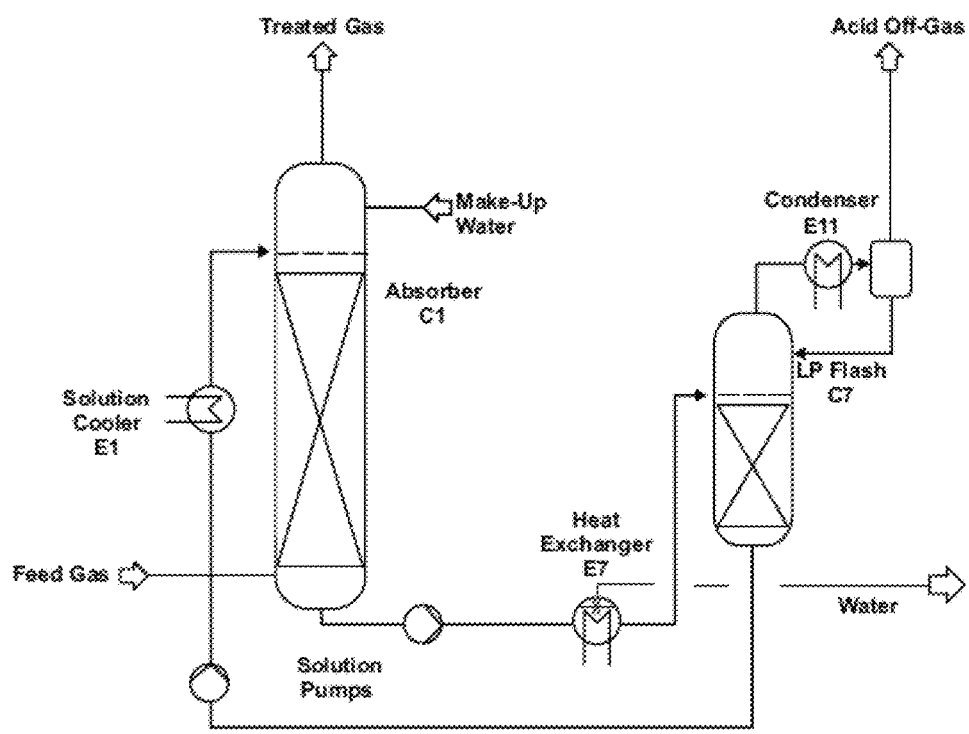
FIG. 2 through FIG. 11 depict installations suitable for carrying out the method of removing an aqueous liquid from the process according to the invention.

With reference to FIG. 2, an acid gas removal system includes an absorber C1 configured with an inlet to receive a fluid stream. The fluid stream may be a combustion exhaust gas. The fluid stream may or may not be passed through other cleaning systems prior to entering the acid gas removal system. Within the absorber, the fluid stream is brought into gas-liquid contact with a non-aqueous absorption liquid containing a hydrophobic amine, which is introduced at the top of absorber C1 via cooler E1. Within the absorber C1, acid gases are transferred from the fluid stream to the non-aqueous absorption liquid. Simultaneously, sulphur oxides present in the fluid stream reacts with the hydrophobic amine component of the non-aqueous absorption liquid to form a sulfamic acid. Water vapour present in the fluid stream may condense in the absorber C1 and form a water-saturated non-aqueous absorption liquid or a biphasic water-absorption liquid mixture. Additional water may be introduced at the top of absorber C1. The acid gas-loaded, sulfamic acid product-containing non-aqueous absorption liquid is directed to a heat exchanger, e.g. a falling film heat exchanger, E7. The heated loaded non-aqueous absorption liquid is kept under a pressure such that no substantial release of acid gases occurs until the loaded non-aqueous absorption liquid reaches a flash vessel C7. An aqueous liquid which separates from the organic phase in the sump of the falling film heat exchanger E7 is removed from the process. The heated loaded non-aqueous absorption liquid is directed to a flash vessel C7 and expanded. By the pressure drop, acid gases are released from the non-aqueous absorption liquid. Entrained non-aqueous absorption liquid components are condensed in condenser E11 and routed back to the flashing vessel C7. Released acid gases can be drawn off for storage or other uses. The regenerated non-aqueous absorption liquid is directed back to the absorber C1.

The advantage of the method depicted in FIG. 2 is that there is no or a very limited amount of aqueous liquid in the flashing vessel, which reduces foaming in the process and increases the operational stability of the process.

Figure 3:
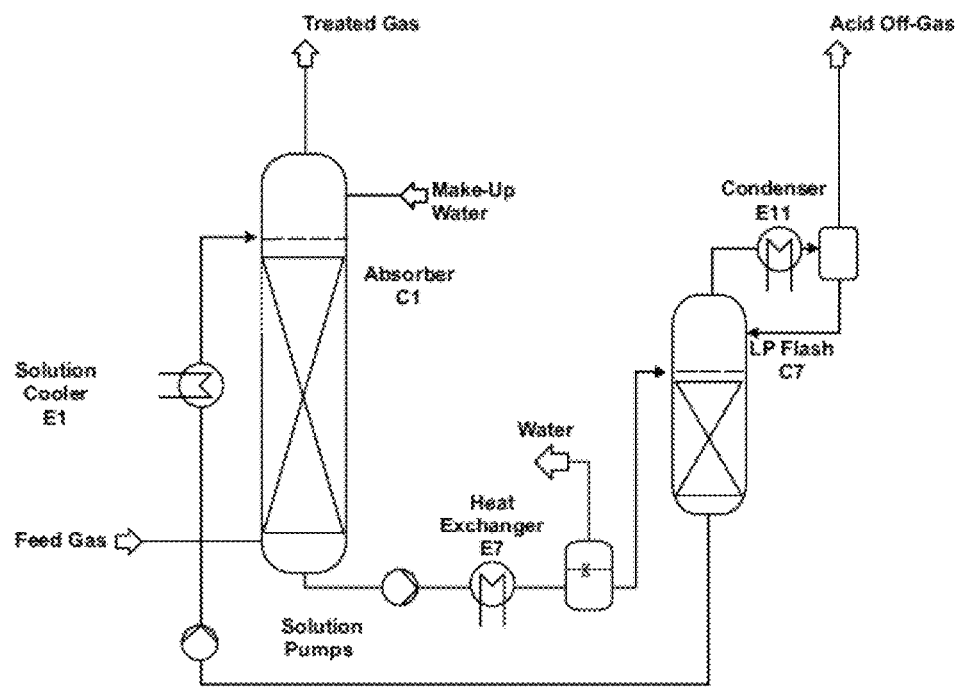

FIG. 3 shows an acid gas removal system similar to FIG. 2. An aqueous liquid is removed from the acid gas loaded non-aqueous absorption liquid by means of a decanter vessel downstream of heat exchanger E7. During passage from the heat exchanger E7 and the decanter, the heated loaded non-aqueous absorption liquid is kept under a pressure such that no substantial release of acid gases occurs until the loaded non-aqueous absorption liquid reaches a flash vessel C7.

Figure 4:
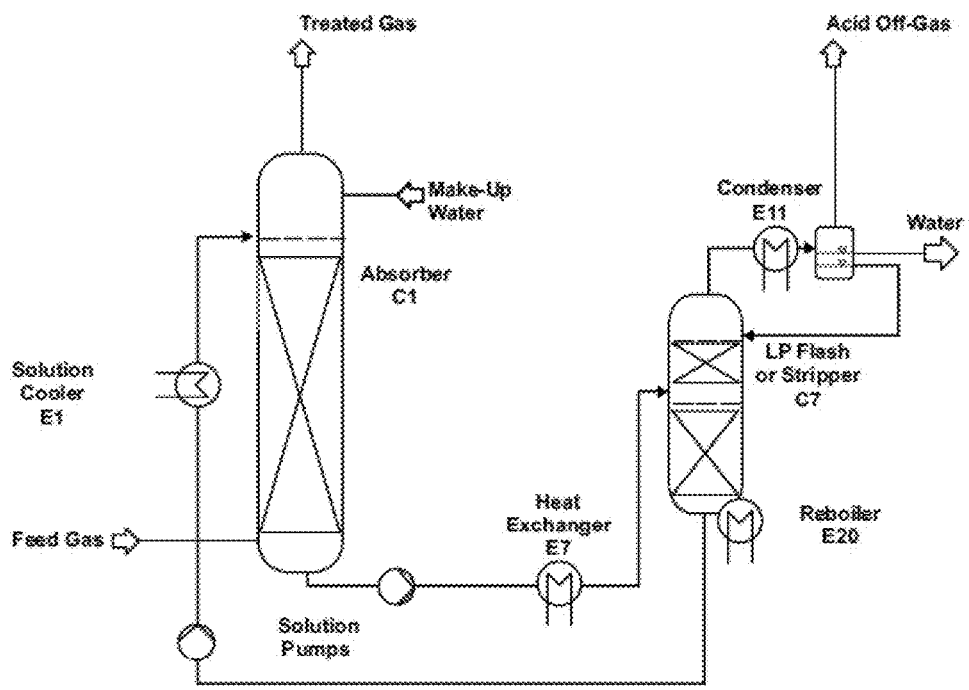

FIG. 4 shows an acid gas removal system similar to FIG. 2. The loaded non-aqueous absorption liquid is regenerated by expansion into flashing vessel C7 and/or heating in stripper C7 (in which case the stripper C7 is equipped with a bottoms reboiler E20). An aqueous liquid is removed from the condensate condensed in condenser E11 of flashing vessel/stripper C7. A rectifying section in the upper part of stripper C7 is envisaged to limit potential absorption liquid losses. The advantages of the method depicted in FIG. 4 include that the acid gas content of the regenerated solvent can be reduced for a given regenerator (C7) operating temperature since steam will act as a stripping agent enhancing solvent regeneration by lowering the $CO_2$ partial pressure. Additionally, water can be collected as a condensate in the overhead of C7 and may be very pure depending upon operation of the rectification section. One drawback is the additional energy demand related to vaporizing steam in C7.

Figure 5:
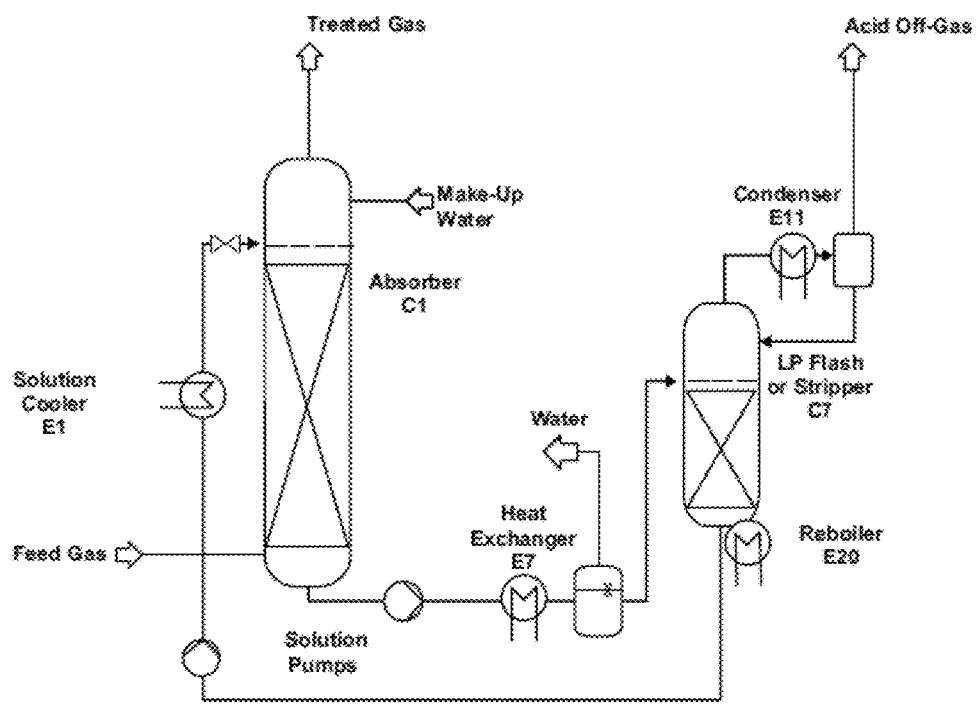

FIG. 5 shows an acid gas removal system similar to FIG. 3 where the stripper C7 is operated at a higher pressure with respect to the absorber C1. This can be achieved by provision of a pressurization pump transferring the loaded non-aqueous absorption liquid from the bottom of the absorber C1 to stripper C7. Releasing the $CO_2$ at higher pressure has the advantage of saving compression energy for subsequent storage or use of the $CO_2$.

Figure 6:
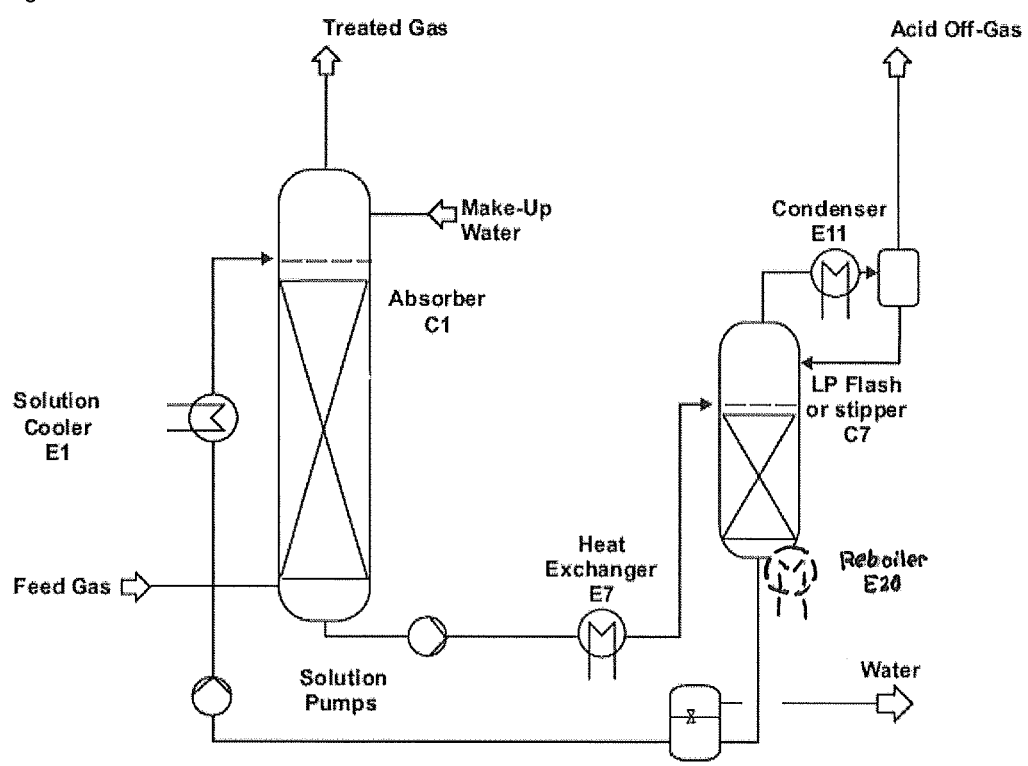

FIG. 6 shows an acid gas removal system similar to FIG. 3 where an aqueous liquid is removed from the regenerated non-aqueous absorption liquid, i.e., downstream the flashing vessel/stripper C7. The advantage of the method depicted in FIG. 6 is a more efficient water removal. It should be appreciated that the embodiment of FIG. 6 may contain multiple decanters. For example, aqueous liquid may be additionally removed from the condensate condensed in condenser E11 of flashing vessel/stripper C7 in a manner as shown in FIG. 4.

Figure 7:
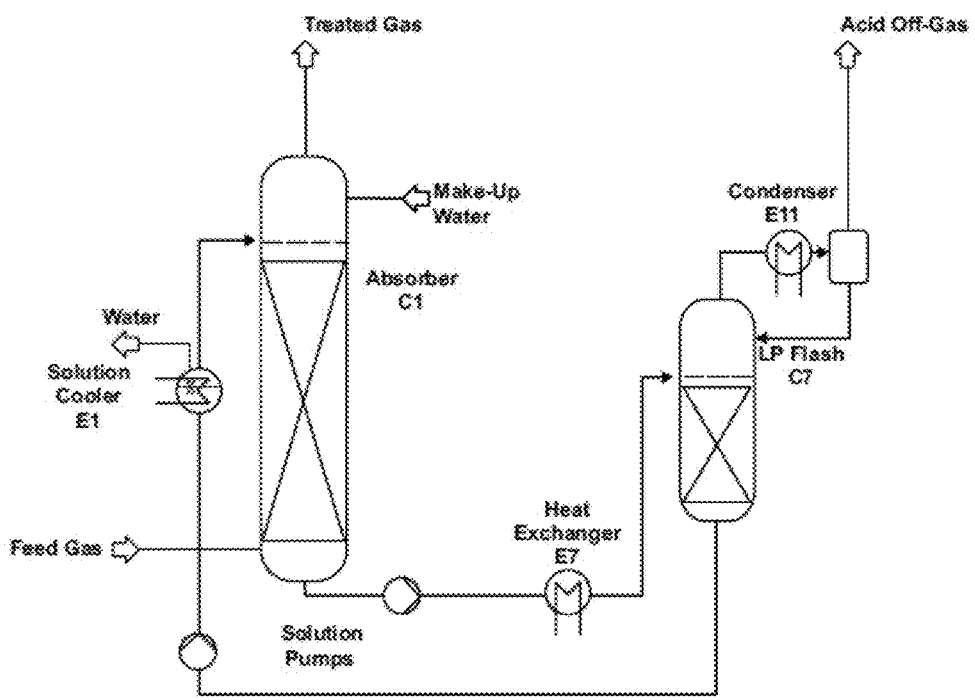

FIG. 7 shows an acid gas removal system similar to FIG. 6 where an aqueous liquid is removed from the process on the regenerated non-aqueous absorption liquid side by use of e.g. a falling film heat exchanger, E1, to separate the aqueous phase from the non-aqueous absorption liquid in the sump of the falling film heat exchanger, E1. The advantage of the method depicted in FIG. 6 is a more efficient water removal with no or a very limited aqueous phase accumulation in the absorber C1 and the flashing vessel/stripper C7, which reduces foaming and increases the operational stability of the process. Additional advantages could include reducing/eliminating the energy load related to water evaporation on the regenerator side by separating water upon cooling of the $CO_2$-lean solvent and separating water from the $CO_2$-lean solution at lower temperature reduces organic content in the water phase. It should be appreciated that the embodiment of FIG. 7 may contain multiple decanters. For example, aqueous liquid may be additionally removed from the heated, loaded non-aqueous absorption liquid in a manner as shown in FIG. 5.

Figure 8:
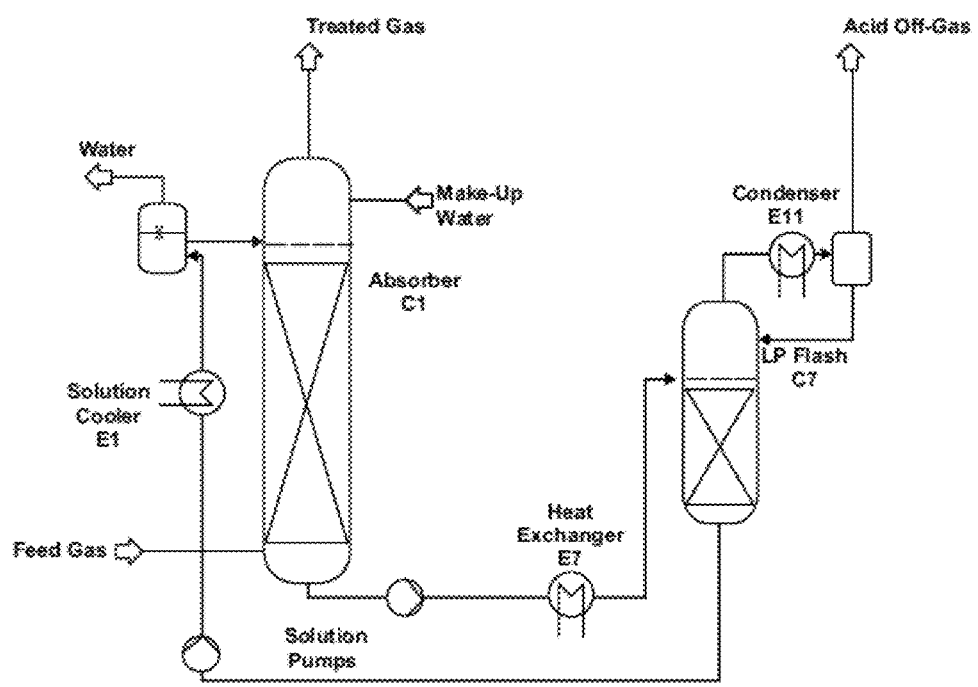

FIG. 8 shows an acid gas removal system similar to FIG. 7 where an aqueous liquid is removed from the non-aqueous absorption liquid on the regenerated absorption liquid side by use of a separator downstream of heat exchanger E1. The advantage of the method depicted in FIG. 6 is a more efficient water removal with no or a very limited aqueous phase accumulation in the absorber C1 and the flashing vessel/stripper C7, which reduces foaming and increases the operational stability of the process. Additional advantages could include reducing/eliminating the energy load related to water evaporation on the regenerator side by separating water upon cooling of the $CO_2$-lean solvent and separating water from the $CO_2$-lean solution at lower temperature reduced organic content in the water phase.

Figure 9:
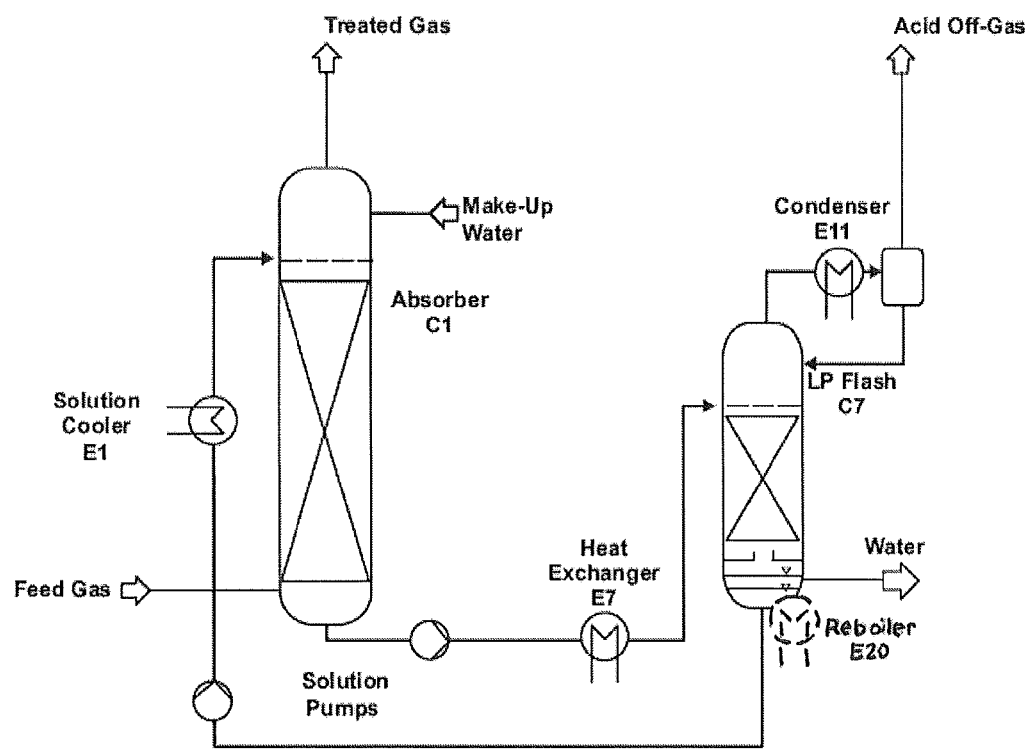

FIG. 9 shows an acid gas removal system where an aqueous liquid is removed from the non-aqueous absorption liquid in the bottom of the stripper C7. The advantage of the method depicted in FIG. 9 is that the aqueous steam that is generated in the reboiler will act as a stripping agent and thus enhance the solvent regeneration by lowering the $CO_2$ partial pressure. Furthermore, water could be collected as a condensate and may be very pure depending upon the operation of the rectification section. A possible disadvantage of the method depicted in FIG. 9 is that the water vaporizes, or establishes equilibrium in the gas phase, thus increasing the energy demand on the regeneration process.

Figure 10:
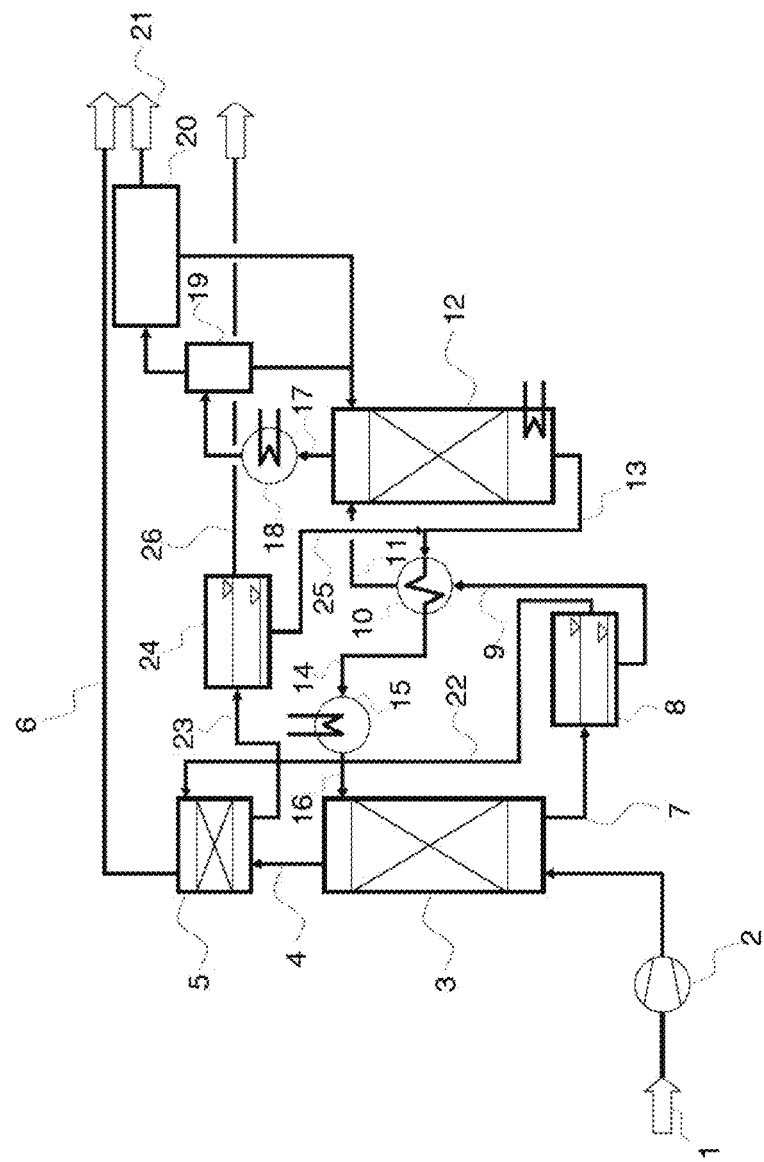

According to FIG. 10, a fluid stream 1, e.g., a flue gas stream, is passed via blower 2 into the lower part of the absorption column 3 and brought into contact in countercurrent flow with a non-aqueous absorption liquid which is introduced via the line 16 into the upper region of the absorption column 3. As described above, the amine component of the non-aqueous solvent reacts with $SO_2$ and $O_2$, both present in the flue gas, in the absorption column 3 to form a sulfamic acid.

The non-aqueous absorption liquid which is loaded with carbon dioxide and containing sulfamic acid is fed from the bottom of the absorption column 3 via line 7 to the decanter 8. An aqueous liquid accumulates as upper layer in decanter 8 and is withdrawn via line 22. Although the aqueous liquid is shown as the upper layer and the non-aqueous absorption liquid as the lower layer, it should be appreciated that the relative densities of the aqueous liquid and the non-aqueous absorption liquid will determine which layer is upper and which is lower. Due to concomitant hydrolysis of the sulfamic acid, the aqueous liquid is acid in nature. Non-aqueous absorption liquid freed from the aqueous liquid separates as lower layer in decanter 8 and is fed via line 9, heat exchanger 10 and line 11 to the stripper 12. In the embodiment of FIG. 10, decanter 8 is shown to be located upstream to heat exchanger 10. It should be appreciated that decanter 8 can also be located downstream heat exchanger 10. In the bottom part of the stripper 12 the loaded non-aqueous absorption liquid is heated via a reboiler. As a result of the temperature elevation, the absorbed acid gases are converted back into the gas phase. The gas phase is removed at the top of the stripper 12 and fed via line 17 to the condenser 18. Non-aqueous absorption liquid which is condensed out is collected in the phase separator 19 and refluxed to the stripper 12. The gaseous acid gases may be conducted to the compressor unit 20 and sent to sequestration via line 21. The regenerated non-aqueous absorption liquid 13 is recycled back to the absorption column 3 via the heat exchanger 10, line 14, the cooler 15, and line 16.

The treated fluid stream depleted in carbon dioxide is fed via line 4 into a scrubbing zone 5. An aqueous liquid is introduced in the scrubbing zone 5 via the line 22. In the scrubbing zone 5, entrained non-aqueous absorption liquid is eliminated from the treated fluid stream; the acidic nature of the aqueous liquid enhances the elimination of entrained non-aqueous absorption liquid from the treated fluid stream in the scrubbing zone 5. In the scrubbing zone 5, also part of the aqueous liquid is volatilized and the treated fluid stream is saturated with water vapour. The treated fluid stream is removed from the scrubbing zone 5 via the line 6.

The spent aqueous liquid collected at the bottom of the scrubbing zone 5 is sent via line 23 to the decanter 24. An aqueous phase accumulates as upper layer in decanter 24 and is discharged via line 26. Entrained non-aqueous absorption liquid separates as lower layer in decanter 24 and is combined via line 25 with the bulk of the regenerated non-aqueous absorption liquid withdrawn from the bottom of the stripper 12 via line 13.

In the process shown in FIG. 10, the aqueous liquid is separated from the loaded non-aqueous absorption liquid. Alternatively, the separation operation may be carried out as shown in any of the processes as depicted in FIGS. 2 through 9.

FIG. 11 illustrates the use of a multiple flash and/or stripper design. The design includes multiple reheating units.

With reference to FIG. 11, an acid gas removal system includes an absorber C1 configured with an inlet to receive a fluid stream. The fluid stream may be a combustion exhaust gas. The fluid stream may or may not be passed through other cleaning systems prior to entering the acid gas removal system. Within the absorber, the fluid stream is brought into gas-liquid contact with a non-aqueous absorption liquid containing a hydrophobic amine, which is introduced at the top of absorber C1 via cooler E1. Within the absorber C1, acid gases are transferred from the fluid stream to the non-aqueous absorption liquid. Simultaneously, sulphur oxides present in the fluid stream reacts with the hydrophobic amine component of the non-aqueous absorption liquid to form a sulfamic acid. Water vapour present in the fluid stream may condense in the absorber C1 and form a water-saturated non-aqueous absorption liquid or a biphasic water-absorption liquid mixture. Additional water may be introduced at the top of absorber C1. The acid gas-loaded, sulfamic acid product-containing non-aqueous absorption liquid is directed to a heat exchanger E7. The heated loaded non-aqueous absorption liquid is directed to a flash vessel C7 and expanded to pressure of, e.g., 5 to 8 bara. By the pressure drop, part of the acid gases is released from the non-aqueous absorption liquid. Entrained absorption liquid components are condensed in condenser E11 and routed back to the flashing vessel C7. Released acid gases can be drawn off for storage or other uses. A partially regenerated non-aqueous absorption liquid is collected at the bottom of flashing vessel C7 and transferred to flashing vessel/stripper C8 and further expanded to pressure of, e.g., 1 to 2 bara. By the pressure drop and optional heating by means of reboiler E20, the remainder of the acid gases is released from the non-aqueous absorption liquid. An aqueous liquid is removed from the regenerated absorption liquid, i.e., downstream the flashing vessel/stripper C8. The regenerated non-aqueous absorption liquid is directed back to the absorber C1. It should be appreciated that the acid gas removal system may contain multiple decanters to recover the aqueous liquid, for example downstream heat exchanger E7 and/or downstream heat exchanger E8.

Due to the design a major part of the $CO_2$ is recovered at elevated pressure. The advantage of the depicted design in FIG. 11 is a reduced $CO_2$ compression demand for potential downstream unit operations.

FIGS. 12 and 13 exemplify embodiments wherein the aqueous liquid is brought into fluid-liquid contact with the treated fluid stream. The aqueous liquid may be recovered as shown in any of the embodiments of FIG. 2 to 9 or 11.

FIG. 12 shows a scrubbing zone (wash section) positioned atop of absorber C1 (which may be the absorber of any of the embodiments of FIG. 2 to 9 or 11). Regenerated non-aqueous absorption liquid from the regenerator (that is, from the bottom of flashing vessel/stripper C7 as shown in FIGS. 2 to 9 or from the bottom of flashing vessel/stripper C8 as shown in FIG. 11; optionally via intermediate units such as a decanter and/or pump) is introduced at the top of absorber C1 via cooler E1. The treated fluid stream leaving the absorption zone is directed to the scrubbing zone (wash section) from below. The aqueous liquid recovered from the process as described in FIGS. 2 through 9 or FIG. 11 is introduced in the upper part of the scrubbing zone (wash section). The treated fluid stream is scrubbed with the aqueous liquid so as to transfer entrained absorption liquid components at least in part into the aqueous liquid. Concomitantly, part of the water contained in the aqueous liquid may be volatilized. Spent aqueous liquid collected at the bottom of the scrubbing zone (wash section) may be sent to a decanter and/or directed to the absorption zone. In the decanter, the spent aqueous liquid is subjected to liquid-liquid phase separation to obtain an aqueous phase and an entrained absorption liquid component phase. The aqueous phase may be discharged and/or recycled to the scrubbing section. The entrained absorption liquid component phase is recycled to the process.

FIG. 13 the scrubbing zone (wash section) is formed integrally with absorber C1. The aqueous liquid recovered from the process as described in FIGS. 2 through 9 or 11 is introduced to the top of the absorber either as a separate liquid feed or blended with the regenerated non-aqueous absorption liquid. Scrubbing of the treated fluid stream with the aqueous liquid so as to transfer entrained absorption liquid components at least in part into the aqueous liquid occurs in the upper part of the absorber. Concomitantly, part of the water contained in the aqueous liquid may be volatilized. It is envisaged that in this embodiment non-aqueous absorption liquid and aqueous liquid will flow co-currently downward through the absorber.

Separation of the spent aqueous liquid and the loaded non-aqueous solvent will occur at the bottom of the absorber (not shown). An aqueous phase that accumulates can be separated and portioned into two sub-streams; one sub-stream can be discharged and the other may be returned to the top of the absorber. This arrangement eliminates the need of a separate scrubbing zone and a separate decanter for the spent aqueous liquid.

EXAMPLE

Observation of Sulphur Absorption by NMR

An NMR tube was loaded with approximately 25 mg of a 1:1 molar solution of 2-fluorophenethylamine and 2,2,3,3,4,4,5,5-octafluoropentanol and approximately 0.5 milliliters of deuterated chloroform ($CDCl_3$). The tube was capped and proton ($^1H$) and fluorine ($^{19}F$) NMR spectra were recorded. The solution was then purged with pure $SO_2$ gas at a flow rate of approximately 10 mL/min. After approximately ten minutes a solid was precipitated from the solution. Proton (FIG. 14) and fluorine NMR spectra (FIG. 15) of the solution containing the precipitate were recorded revealing loss of the amine component.

The solid was extracted from the tube, placed into a separate NMR tube, and dissolved with approximately 0.5 mL of deuterated dimethylsulfoxide (DMSO-$d_6$). Examination of the proton and fluorine NMR spectra showed the amine without the alcohol (FIG. 16). The presence of only one set of fluorine resonances in the fluorine NMR spectrum corresponds to a product which includes only the amine in the molecular structure and indicates that the sulphur-containing product has only one unique fluorinated amine moiety in its structure. This is consistent with a sulfamic acid structure.

We claim:

1. A process for removing sulphur oxides from a fluid stream comprising
    a) providing a non-aqueous absorption liquid containing at least one hydrophobic amine, the non-aqueous absorption liquid being incompletely miscible with water;
    b) treating the fluid stream in an absorption zone with the non-aqueous absorption liquid to transfer at least part of the sulphur oxides into the non-aqueous absorption liquid and to form a sulphur oxide-hydrophobic amine-complex;
    c) causing the non-aqueous absorption liquid to be in liquid-liquid contact with an aqueous liquid whereby at least part of the sulphur oxide-hydrophobic amine-complex is hydrolyzed to release the hydrophobic amine and sulphurous hydrolysis products, and at least part of the sulphurous hydrolysis products is transferred into the aqueous liquid;
    d) separating the aqueous liquid from the non-aqueous absorption liquid.

2. The process of claim 1, wherein the non-aqueous absorption liquid is caused to be in liquid-liquid contact with the aqueous liquid by condensing water vapour which is present in the fluid stream to be treated.

3. The process of claim 1, wherein the absorption liquid is caused to be in liquid-liquid contact with the aqueous liquid by contacting the non-aqueous absorption liquid with extraneous water.

4. The process according to claim 1, wherein separating the aqueous liquid from the non-aqueous absorption liquid occurs by at least one of decanting and centrifuging.

5. The process according to claim 1, wherein formation of the sulphur oxide-hydrophobic amine-complex involves oxidation of the sulphur oxides.

6. The process of claim 5, wherein oxidation is effected by molecular oxygen present in the fluid stream to be treated.

7. The process according to claim 1, wherein the sulphur oxide-hydrophobic amine-complex comprises a sulfamic acid structural moiety.

8. The process according to claim 1, wherein the sulphurous hydrolysis products comprise at least one of sulphurous acid and sulphuric acid.

9. The process according to claim 1, wherein at least part of the separated aqueous liquid is brought into fluid-liquid contact with the treated fluid stream.

10. The process according to claim 9, wherein at least part of the water contained in the aqueous liquid is volatilized by the fluid-liquid contact with the treated fluid stream.

11. The process according to claim 9, wherein non-aqueous absorption liquid components entrained by the treated fluid stream are transferred at least in part into the aqueous liquid.

12. The process according to claim 11, wherein the spent aqueous liquid is subjected to liquid-liquid phase separation to obtain an aqueous phase and an entrained non-aqueous absorption liquid component phase.

13. The process according to claim 9, wherein the treated fluid stream is directed to a scrubbing zone in which the treated fluid stream is brought into fluid-liquid contact with the aqueous liquid.

14. The process according to claim 13, wherein the fluid stream is passed upwards through a tower including a lower portion containing the absorption zone and an upper portion containing the scrubbing zone.

15. The process according to claim 1, wherein the fluid stream additionally comprises acid gases other than sulphur oxides, and an acid gas-loaded non-aqueous absorption liquid is obtained in step b), the process comprising
    e) regenerating the loaded non-aqueous absorption liquid to expel the acid gases at least in part and obtain a regenerated non-aqueous absorption liquid, and directing the regenerated non-aqueous absorption liquid to step b).

16. The process according to claim 15, wherein separating the aqueous liquid from the non-aqueous absorption liquid comprises subjecting the loaded non-aqueous absorption liquid to liquid-liquid phase separation to separate the aqueous liquid therefrom.

17. The process according to claim 15, wherein separating the aqueous liquid from the non-aqueous absorption liquid comprises subjecting the regenerated non-aqueous absorption liquid to liquid-liquid phase separation to separate the aqueous liquid therefrom.

18. The process according to claim 15, wherein regenerating the loaded non-aqueous absorption liquid occurs by pressure release, heating, stripping or any combination thereof.

19. The process according to claim 15, wherein the fluid stream has an acid gas partial pressure of less than 2 bar.

20. The process according to claim 1, wherein the fluid stream is an exhaust gas from a combustion process.

21. The process according to claim 1, wherein the hydrophobic amine is selected from 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 2-fluorobenzylamine, 3-fluorobenzylamine, 4-fluorobenzylamine, 4,4,5,5,6,6,7,7,8,8,9,9,10,10,11,11,11-heptadecafluoroundecylamine, 2,3-difluorobenzylamine, 2,4-difluorobenzylamine, 2,6-difluorobenzylamine, 3,4-difluorobenzylamine, 3,5-difluorobenzylamine, 2-trifluormethylbenzylamine, 3-trifluormethylbenzylamine, and 4-trifluormethylbenzylamine.

22. The process according to claim 1, wherein the non-aqueous absorption liquid comprises a non-aqueous diluent.

23. The process according to claim 22, wherein the diluent is selected from 2,2,3,3,4,4,5,5-octafluoropentanol ("OFP"); 2,2,3,3-tetrafluoropropanol ("TFP"); 2,2,3,3,3-pentafluoropropanol ("PFP"); 2,2,3,3,4,4-hexafluorobutanol ("HFB"); 2,2,2-trifluoroethanol ("TFE"); nonafluoro-1-hexanol; 4,4,5,5,6,6,7,7,7-nonafluoroheptanol; 1,1,3,3-hexafluoro-2-phenyl-2-propanol; and mixtures thereof.

* * * * *